No. 844,136. PATENTED FEB. 12, 1907.
O. KAMPFE.
CANDLE HOLDER.
APPLICATION FILED MAY 1, 1906.
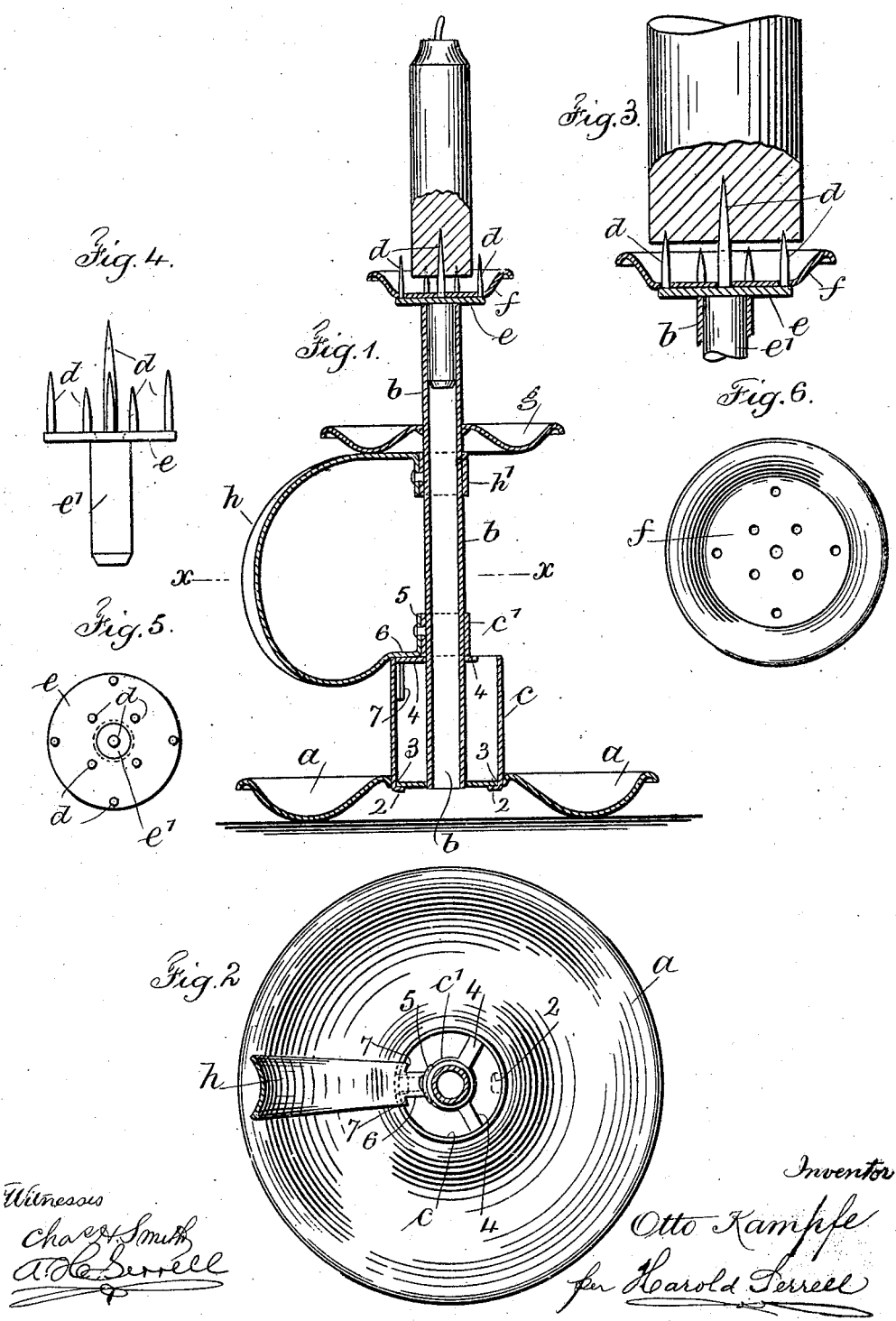

UNITED STATES PATENT OFFICE.

OTTO KAMPFE, OF NEW YORK, N. Y.

CANDLE-HOLDER.

No. 844,136.        Specification of Letters Patent.        Patented Feb. 12, 1907.

Application filed May 1, 1906. Serial No. 314,628.

*To all whom it may concern:*

Be it known that I, OTTO KAMPFE, a citizen of the United States, residing at the borough of Brooklyn, in the county of Kings, city and State of New York, have invented a new and useful Improvement in Candle-Holders, of which the following is a specification.

Candle-holders as usually heretofore constructed consisted of a saucer-shaped base member and eye-strap for the finger and a standard in the upper end of which was a socket for the candle, the same being formed of metal or china. These devices were continually clogging and filling up, they were adapted for only an average-sized candle, and were often untidy and uncleanly. Besides the candle and its holder were separate from the match required for lighting the candle.

The object of my invention is to produce a candle-holder adapted for candles of different sizes, one on which matches in a holder are constantly present, and means for keeping part of the holder adjacent to the candle clean.

In the device of my improvement a tubular central stem is connected centrally to a saucer-shaped base. A tubular shell surrounds this stem, rests upon and is secured to the base and forms a match-holder. I provide a series of candle-holding prongs secured to a removable support adapted to fit in the upper end of the tubular stem and to carry a drip catcher or saucer which is perforated to pass down over the prongs to their support. Intermediate of this latter and the base is a saucer-shaped part secured to the tubular stem, and a handle extends between this latter part and the upper edge of the match-holder or other convenient point of attachment for carrying the candle-holder about, all of which is hereinafter more particularly described.

In the drawings, Figure 1 is a vertical section and partial elevation representing the device of my improvement. Fig. 2 is a sectional plan at the dotted line $x$ $x$ of Fig. 1. Fig. 3 is a partial detached section and elevation at the candle-holding end. Fig. 4 is an elevation of the pronged metal holder. Fig. 5 is a plan of the part shown in Fig. 4, and Fig. 6 a plan of the drip-catcher device. Figs. 3 to 6, inclusive, are of exaggerated size over Figs. 1 and 2 for clearness.

The candle-holder of my invention is to be made of metal, and in the same $a$ represents the saucer-shaped base centrally perforated and adapted to receive the lower end of a tubular stem $b$, the parts at the union being preferably soldered together.

The base $a$ is preferably made with a central flat depressed portion of a diameter agreeing with and adapted to receive the tubular shell $c$. This central portion is provided with opposite apertures 3 to receive the opposite lugs 2 of the said tubular shell $c$, which lugs pass through the apertures and are bent up against the under side of the base, thus holding the shell in position.

I provide arms 4, formed as part of a sort of spider-frame secured to the stem $d$ and spanning the space between the same and the upper edge of the shell $c$ and preferably secured to both parts, so as to center the shell and hold it in position.

I provide a series of candle-holding prongs $d$, secured in any desired manner to a circular base $e$, which base is provided with a stem $e'$, adapted to fit the upper open end of the stem $b$, as shown in Figs. 1 and 3. These prongs are by preference of various sizes, the central prong being advantageously the longest and the four surrounding prongs shorter than the four outer prongs. The object of this is illustrated clearly in Figs. 1 and 3.

In Fig. 1 a small candle is held upon the prongs, the long central prong passing into the central part of the candle and the short prongs around the same, receiving the lower end of the small candle, whereas in Fig. 3 a large candle is employed, the center prong entering the center of the candle and said candle resting upon the outer prongs, which pass into the same, the candle being shown as above and clear of the short prongs, which surround the center prongs. The device is then adapted for candles of different sizes, the prongs entering the candle at the proper places according to its size.

I provide a drip-saucer $f$, the flat base of which is adapted to rest upon the flat surface of the base $e$. This drip-saucer is provided with series of perforations receiving the various prongs as the saucer is passed over the prongs to rest upon the base. This saucer receives the drip from the burning candle, and it will be apparent that when the candle is consumed or when a partly-burned candle is removed from the prongs that when the drip-saucer may be raised the act of raising and removing the same clears the prongs mainly of the drip of the candle, and that after the drip-saucer is removed it can be cleaned and replaced over the prongs, where it is loosely supported. (See Figs. 1 and 3.)

Intermediate of the position of the drip-saucer $f$, the prongs, and the base $a$ I place a saucer-shaped member $g$, which surrounds and is secured to the stem $b$, and I provide a handle $h$ in the form of a band or loop coming between the member $g$ and the shell $c$. This handle at its upper end is preferably secured to a sleeve $h'$ by a rivet, the sleeve being around the stem $b$.

The lower end of the handle may be secured in any desired manner to the shell or to the support of the upper end of the shell from the stem $b$. I have shown, however, the lower end of the handle as provided with a curved upturned portion 5 and an arm 6, which passes from the upper edge of the shell $c$ over to a tubular member $c'$ around the stem $b$, with parts or lugs 7 bent down from the lower end of the handle and coming inside of the shell $c$. In this way the lower end of the handle is very firmly connected in position, the lug 7 being soldered or riveted, or both, to the upper end of the shell $c$ and the curved part 5 riveted or soldered, or both, to the tubular member $c$. I do not limit my invention to the employment of this form of connection at the lower end of the handle nor to the arms 4, which extend across the top of the shell $c$, nor to the tubular member $c'$, as these parts may be varied without departing from my invention. This tubular shell $c$ forms the match-holder, the matches being stood up endwise in the same around the stem $b$, and so long as there are any matches in this shell the means for lighting the candle are at hand, and wherever the candle-holder and candle are the matches in the shell supply the means of lighting the same without the user moving or stopping to find the matches.

From the foregoing description it will be apparent that the function of the base $a$ is a supporting function, while the function of the member $g$ is mainly ornamental, but still useful to catch any drip that may overflow from the saucer $f$ and keep the same away from the matches in the shell $c$ beneath.

I claim as my invention—

1. A candle-holder comprising a base, a tubular stem, a handle secured to the tubular stem, a series of candle-holding prongs, a base to which the same are secured, a stem formed with said base and adapted to fit in the upper end of the tubular stem and a drip-saucer having series of perforations coinciding in position with the series of prongs and adapted to fit over the prongs and rest upon the base to which the prongs are secured.

2. A candle-holder comprising a saucer-shaped base, a tubular central stem, a bent band or handle secured to the tubular stem intermediate of its length, a base and series of candle-holding prongs secured thereto and rising therefrom and a stem formed with the said base and adapted to pass into and to be removable from the upper open end of the tubular stem and a drip-saucer having a series of perforations agreeing with the location of the said prongs and adapted to pass over the prongs and to rest upon their support.

3. A candle-holder comprising a base, a tubular stem, a handle secured to the tubular stem, a candle-holding device and a support for the same, a tubular shell concentric with and surrounding the tubular stem and at its lower end resting upon and secured to the saucer-shaped base and forming a match-holder and a device intermediate of the candle-holder and match-holder for intercepting the drippings of the candle.

4. A candle-holder comprising a saucer-shaped base, a tubular central stem, a bent band or handle secured to the tubular stem intermediate of its length, a candle-holding device and a support therefor, a drip-saucer associated with the candle-holder and a tubular shell concentric with and surrounding the tubular stem and at its lower end resting upon and secured to the saucer-shaped base and forming a match-holder and a saucer-shaped member $g$ intermediate of the candle-holder and match-holder for the function described.

5. In a candle-holder, the combination with a tubular support, of a stem adapted to fit in the upper end of the tubular support, a base at right angles to the stem and adapted to rest upon the end of the said tubular stem, and a series of candle-holding prongs, consisting of a long center prong, a series of short prongs surrounding the same and a series of outside prongs of a length intermediate of the short prongs and the central prongs.

6. A candle-holder comprising a saucer-shaped base, a tubular central stem, a bent band or handle secured to the tubular stem intermediate of its length, a base and series of candle-holding prongs secured thereto and rising therefrom, a stem formed with the said base and adapted to pass into and to be removable from the upper open end of the tubular stem, a drip-saucer having a series of perforations agreeing with the location of the said prongs and adapted to pass over the prongs and to rest upon their support, a tubular shell concentric with and surrounding the tubular stem and at its lower end resting upon and secured to the saucer-shaped base and forming a match-holder, and a drip-saucer having a flat base and series of perforations agreeing in number, position and in diameter with a series of candle-holding prongs and adapted to pass over the same and to rest upon their base-support.

7. In a candle-holder, the combination with a saucer-shaped base and a central tubular stem, of tubular members or sleeves $c'$ $h'$ surrounding and secured to the tubular stem, a bent handle $h$ at its upper end secured to the member $h'$ and at its lower end secured to the member $c'$.

8. In a candle-holder, the combination with a saucer-shaped base and a central tubular stem, of a tubular shell $c$ resting upon the said base and placed concentric with the tubular stem and having lugs passing through openings in said base which are overturned to secure the shell in position and means secured to the upper edge of the said shell and spanning the space between the same and the tubular stem as support-arms for centering and supporting the upper end of the said shell.

9. In a candle-holder, the combination with a saucer-shaped base and a central tubular stem, of a tubular shell $c$ resting upon the said base and placed concentric with the tubular stem and having lugs passing through openings in said base which are overturned to secure the shell in position and a bent handle in the form of a loop secured at its upper end to the said stem and at its lower end secured both to the stem and to the upper edge of the shell and having a part extending across from the shell to the stem as a support-arm.

Signed by me this 26th day of April, 1906.

OTTO KAMPFE.

Witnesses:
  GEO. T. PINCKNEY,
  E. ZACHARIASEN.